United States Patent [19]

Nilsson

[11] Patent Number: 4,889,625

[45] Date of Patent: Dec. 26, 1989

[54] FILTER FOR CONCENTRATING SUSPENSIONS

[76] Inventor: Harry Nilsson, Nägeliweg 7, CH-8274 Tägerwilen, Switzerland

[21] Appl. No.: 194,250

[22] Filed: May 16, 1988

[30] Foreign Application Priority Data

May 15, 1987 [SE] Sweden .............................. 8702005

[51] Int. Cl.$^4$ ............................................. B01D 33/26
[52] U.S. Cl. ............................ 210/331; 210/333.01; 210/391
[58] Field of Search ................ 210/331, 333.01, 333.1, 210/345, 346, 347, 391, 406, 411, 412, 486

[56] References Cited

U.S. PATENT DOCUMENTS

| | | | |
|---|---|---|---|
| 4,056,473 | 11/1977 | Nilsson | 210/331 |
| 4,648,970 | 3/1987 | Hermansson | 210/331 |
| 4,678,575 | 7/1987 | Frykhult | 210/331 |

Primary Examiner—Ivars Cintins
Attorney, Agent, or Firm—Pollock, Vande Sande & Priddy

[57] ABSTRACT

A filter to concentrating fiber suspension of the type having annular filter discs (2) which rotate about a collection trough (13) for dewatered fibers. Each filter disc comprises two mutually spaced filter elements (3) which, together with an annular wall (4) radially inwardly terminating the disc, define a filtrate chamber (5) inside the disc. The filtrate chamber (5) communicates radially outwardly with its surroundings. The suspension container (1) of the filter is inwardly provided under the suspension surface with an arcuate duct (15) for each disc, this duct being in communication with the filtrate outlet (17) of the container. There is communication between each disc (2) and associated duct (15) such that the filtrate can be transferred from a filtrate chamber to the respective duct (15).

9 Claims, 3 Drawing Sheets

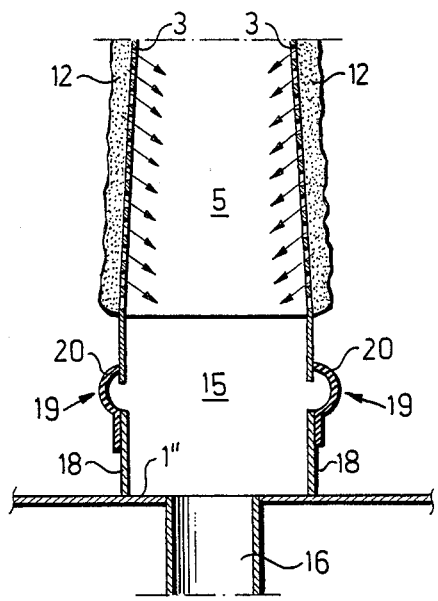
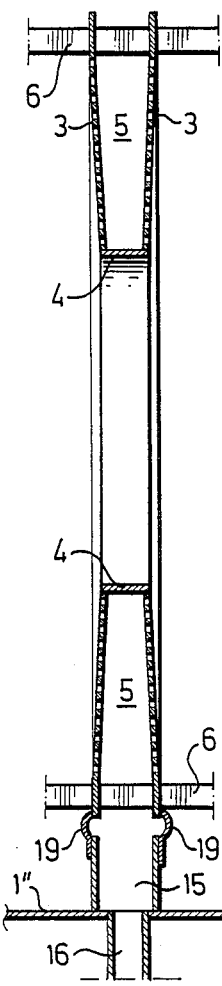
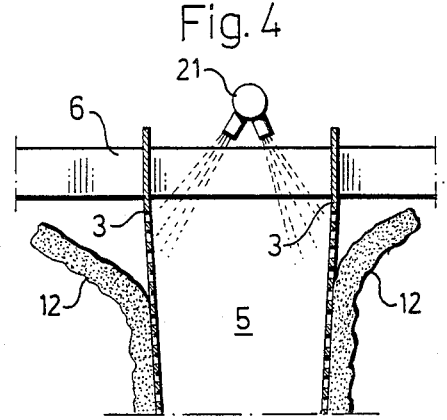

FILTER FOR CONCENTRATING SUSPENSIONS

FIELD OF THE INVENTION

The present invention relates to a filter, preferably intended for concentrating suspensions such as fiber suspension, and of the type including at least one disc partially submerged in a suspension container and rotatable about a substantially horizontal axis, the discs having two mutually spaced filter elements defining a filtrate chamber, the filtrate being conveyed through the filter elements to the filtrate chamber, and from it to a filtrate outlet, while a filter cake is built up on the outside of the filter elements.

BACKGROUND OF THE INVENTION

Such filters are known, e.g. from SE-A-7406315-7, which discloses a filter where the filtrate is lead into central annularly arranged axial ducts, and from SE-A-8305817-2, which discloses a filter in which the filtrate is led to ducts at the disc periphery.

In certain filtering cases, such as dewatering, i.e., when the concentration of fibers in a pulp suspension is to be increased from, e.g., 0.5% to 3%, a very large filtrate flow capacity is required in the filter used, as well as relatively high rotational rates. Conventional filters which are in themselves excellent filters in higher concentration ranges, i.e., when smaller filtrate quantities are present and lower rotational rates are utilized, are not capable of removing large amounts of filtrate in the short time available from when a disc sector rises above the suspension surface until the filter cake deposited on the sector is to be removed. As a result, the filtrate runs out of the section and again wets the dewatered filter cake.

SUMMARY OF THE INVENTION

The object of the invention is thus to provide an improved filter of the kind mentioned in the introduction, which does not have the mentioned drawbacks.

BRIEF DESCRIPTION OF THE DRAWINGS

In order that the invention may be more clearly understood, several embodiments thereof will now be described with reference to the accompanying drawings, wherein

FIG. 3 is a section along line III—III in FIG. 2, showing a detail of the filter to a larger scale;

FIG. 4 is a section along the line IV—IV in FIG. 2, showing another detail of the filter to a larger scale;

FIG. 5 is a section along the line V—V in FIG. 2, the filter disc being implemented according to a particular embodiment of the invention.

DESCRIPTION OF PREFERRED EMBODIMENTS

Figure 2:
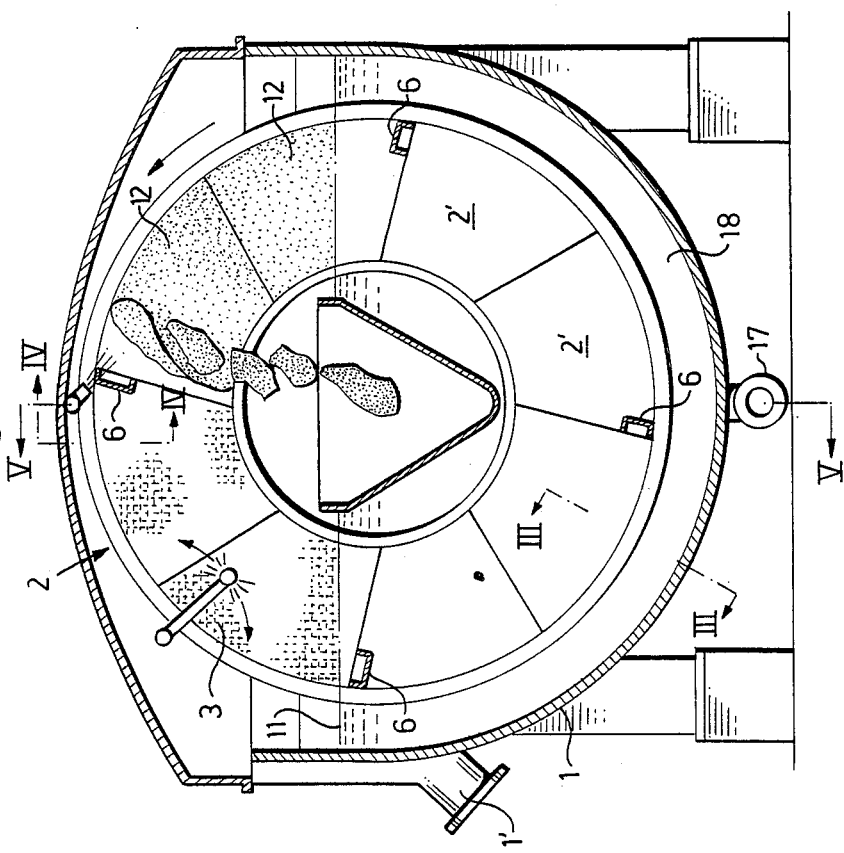
FIG. 2 is a section along line II—II in FIG. 1.
Figure 1:
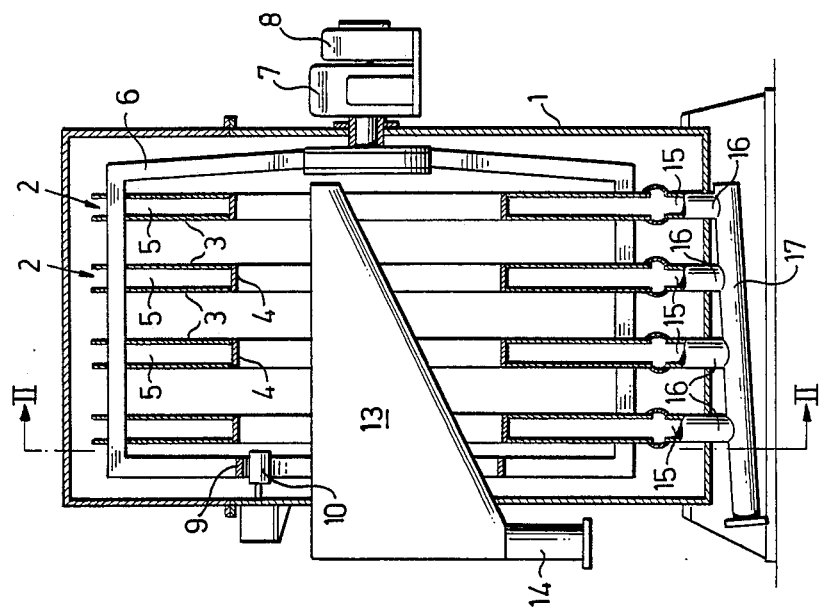
FIG. 1 is an axial section through a filter in accordance with the invention.

FIGS. 1 and 2 schematically illustrate a filter in accordance with the invention, which includes a container 1 for the suspension supplied through an inlet pipe 1'. A filter rotor comprising a plurality of parallel, annular discs 2 is partially submerged in the container 1. Each disc includes two mutually spaced filter elements 3 and an annular inner wall 4, which together with the insides of the filter elements 3 define a filtrate chamber 5. The discs 2 are carried in a cage 6, which is mounted in a bearing 7 at one end and is driven for rotation by a gear box 8, the other end of the cage being terminated by a rotor ring 9 coacting with support rollers 10 mounted in the end wall of the container 1. When the discs are rotated, a filter cake 12 is deposited on the filter elements 3 during passage under the suspension surface 11. A collection trough extends in through the filter rotor from the open end of the rotor, to the left in FIG. 1, such that lumps of filter cake 12 falling from the discs 2 can be caught in the trough 13 and taken away through an outlet 14.

In accordance with the invention, each disc 2 is open radially outwardly at least along a portion of its circumference, so that the space between the filter elements 3, i.e., the filtrate chamber 5, communicates with the surroundings, and the container 1 is provided with an arcuate duct 15, at least along a portion of its interior circumference under the suspension surface 11 and under each disc 2, there being communication between the disc 2 and duct 15 when the mentioned portion of the disc passes the duct 15, such that the filtrate can be transferred from the filtrate chamber 5 to the duct 15. To advantage, all the ducts 15 can connect up to a common filtrate outlet line 17, e.g., via vertical tubes 16.

An example of the the implementation of a disc 2 and associated duct 15 is illustrated in FIG. 3. On the bottom 1" of the container, there are fixed parallel fins 18, forming the side walls of the ducts 15. There are sealing means 19 on the fins 18, the means being adapted, e.g., by means of sealing lips 20, to provide a sliding seal against the filter elements 3 of the disc 2. The sealing means preferably engage against the outside of the filter elements 3, so that the pressure difference between the suspension and the filtrate chamber 5 contributes to an increased sealing action. In the illustrated preferred embodiment of the disc 2, the space 5 between the filter elements 3 is completely open radially outwardly (apart from possible transverse struts or the like). The ducts 15 can extend over a part of the container bottom 1", and of course they must be provided with some form of closure to the duct ends, or over the entire container bottom, i.e., at least level with the suspension surface 11 but preferably above it, as illustrated in FIG. 2.

Due to the static pressure difference prevailing between the outside and inside of the filter elements 3, i.e., between the suspension in the container 1 and the filtrate chamber 5, during the passage of a disc 2 under the suspension surface 11 and simultaneous communication with a duct 15, filtration takes place through the filter elements 3, the filtrate being led to the outlet line 17 and a layer of filter cake 12 being built up on the outside of the filter elements. This layer is lifted up above the suspension surface by the rotation of the disc 2 and is deposited in the collection trough 13.

Since the space 5 between the filter elements 3 in accordance with the invention is open radially outwards, and particularly in cases where it is completely open, there are further significant advantages, namely, with respect to removing the filter cake from the filter elements 3. In such a case it is possible, as illustrated in FIG. 4, of arranging a water jet array 21, which is adapted to spray water jets against the filter elements 3 from the inside, for the purpose of liberating the filter cakes deposited on them. The jets can thus be directed such that a considerable component thereof impinges on the filter cake from the inside in a direction directly facilitating lberation. In addition, the water which does not pass through the filter element but remains in the chamber 5 will to a great extent not rewet the thickened suspension falling down into the collection trough 13.

In FIG. 1, the filter elements 3 are shown as substantially parallel. FIG. 3, and even more clearly FIG. 5, illustrates an embodiment in which the filter elements 3 diverge towards their circumferences. This provides more space for the jet array 21, in that the filtrate chamber 5 will have an increasing cross-section towards the periphery, and finally in that removal of the filter cake is facilitated (the filter element slopes outwardly from the plumbline, as shown in FIG. 4.

Figure 6:
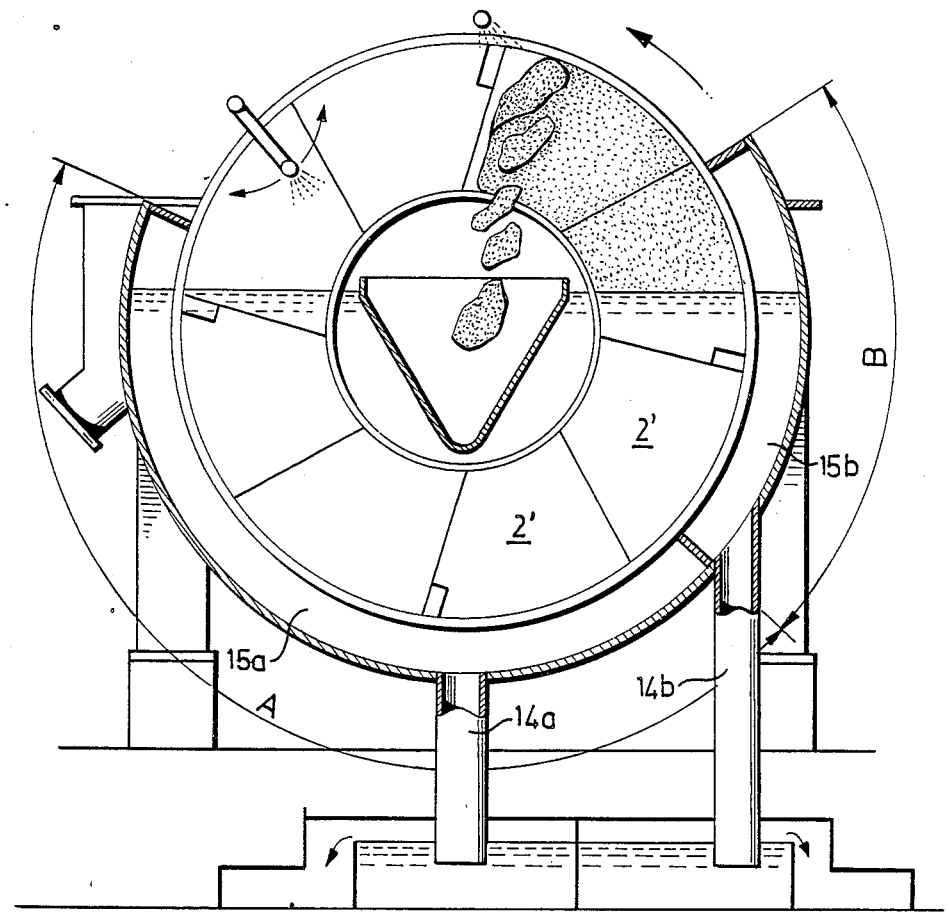
FIG. 6 is a cross-section through a variant of the filter in accordance with the invention.

In certain applications, it is desirable to devide the filtrate into several fractions. FIG. 6 illustrates a filter in accordance with the invention adapted for such a requirement, whereby two filtrate fractions can be removed. Thus, for each filter disc there are two ducts 15a and 15b, one after the other, and each connected to an outlet 14a, 14b, the duct 15a being active within a zone A, which is upstream in the direction of rotation, and the duct 15b further downstream in a zone B. The reason for such a division may be that the filtrate during an earlier stage of the filtration has carried with it a relatively large proportion of fibers, while filtration during a later stage becomes more effective due to the fiber layer deposited on the filter elements, this layer being a filter-in itself. On the other hand, the flow is greater during the earlier stage than the later stage. For this reason, zone A is considerably larger than zone B. Another reason for division into separate filtering zones may be that it is desired to apply a vacuum on the outlet side in a later zone, thereby increasing the pressure difference across the filter elements. In cases where the filtrate is removed in several zones, the disc 2 is suitably provided with internal, substantially radial or oblique intermediate walls (not shown), which prevent the filtrate from running from a downstream part of the disc (as seen in the direction of rotation) towards an upstream part, e.g., from zone B towards zone A in FIG. 6. In applying the invention it is fully possible to allow the discs 2 to be unbroken in the plane of the disc, although for practical reasons, and as usual in the art of filtering, it is preferred to build up the discs from a plurality of disc sectors 2', as illustrated in FIGS. 2 and 6.

I claim:

1. A filter for concentrating fiber suspensions, and comprising at least one disc (2) partially submerged in a suspension in a suspension container (1) and rotatable about a substantially horizontal axis, the disc having two mutually spaced filter elements defining a filtrate chamber (5), the filtrate being conveyed through the filter elements to the filtrate chamber (5), and from it to a filtrate outlet (17), while a filter cake (12) is built up on the outside of the filter elements (3), wherein the filtrate chamber (5) communicates with at least a portion of the outer circumference of the disc (2), and along at least a portion of its inner circumference the container (1) is provided under the surface (11) of the suspension with an arcuate duct (15) in communication with the filtrate outlet (17), there being communication between the disc (2) and duct (15) such that the filtrate can be transferred from the filtrate chamber (5) to the duct (15) when said portion of the circumference of the disc (2) passes the duct (15) when the disc rotates.

2. Filter as claimed in claim 1, wherein the filtrate chamber (5) is open in a radial direction along a substantial part of the outer disc circumference.

3. Filter as claimed in claim 1, wherein the filtrate chamber (5) is radially inwardly defined by an annular wall (4).

4. Filter as claimed in claim 3, wherein the disc (2) is radially inwardly terminated at the annular wall (4) and collection means (13) are inserted through all discs (2).

5. Filter as claimed in any one of claims 1, 2 and 4, wherein the duct (15) is provided with sealing means (19) which are adapted for achieving a sliding seal against the disc (2).

6. Filter as claimed in claim 5, wherein the sealing means (19) engage against the disc (2) from the outside.

7. Filter as claimed in any one of claims 1, 2 and 4, wherein the duct (15) is defined by the bottom (1") of the container (1) and two fins (18) upstanding from said bottom.

8. Filter as claimed in any one of claims 1, 2 and 4, comprising a plurality of ducts (15a, 15b) mutually separated in a circumferencial direction and connected to separate outlets.

9. Filter as claimed in any one of claims 1, 2 and 4, comprising a water jet array (21) directing water jets against the insides of the filter elements (3) from inside the disc (2).

* * * * *